(12) United States Patent
Nakazumi et al.

(10) Patent No.: US 6,312,019 B1
(45) Date of Patent: Nov. 6, 2001

(54) PIPE JOINT

(75) Inventors: Masahiro Nakazumi; Shizuo Mori, both of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/631,935

(22) Filed: Aug. 3, 2000

Related U.S. Application Data

(63) Continuation of application No. 09/570,176, filed on May 12, 2000.

(30) Foreign Application Priority Data

Aug. 3, 1999 (JP) .................................................. 11-220117

(51) Int. Cl.⁷ .............................. F16L 39/00; F16L 37/00
(52) U.S. Cl. ............................ 285/39; 285/340; 285/308; 285/322
(58) Field of Search ............................ 285/39, 340, 322, 285/308

(56) References Cited

U.S. PATENT DOCUMENTS

| | | | | |
|---|---|---|---|---|
| 4,645,246 | * | 2/1987 | Guest | 285/307 |
| 4,796,924 | * | 1/1989 | Kosugi et al. | 285/39 |
| 4,890,865 | * | 1/1990 | Hosono et al. | 285/39 |
| 4,919,457 | * | 4/1990 | Moretti | 285/39 |
| 5,085,472 | * | 2/1992 | Guest | 285/308 |
| 5,681,062 | * | 10/1997 | Fukao et al. | 285/340 |
| 5,762,380 | * | 6/1998 | Hiwatashi et al. | 285/39 |

FOREIGN PATENT DOCUMENTS

| | | | | |
|---|---|---|---|---|
| 378035 | * | 7/1990 | (EP) | 285/322 |
| 2060106 | * | 4/1981 | (GB) | 285/340 |
| 1602077 | * | 11/1981 | (GB) | 285/322 |
| 234686 | * | 9/1989 | (JP) | 285/340 |
| 405248581 | * | 9/1993 | (JP) | 285/340 |

* cited by examiner

*Primary Examiner*—Eric K. Nicholson
(74) *Attorney, Agent, or Firm*—Oblon, Spivak, McClelland, Maier & Neustadt, P.C.

(57) ABSTRACT

A pipe joint is provided in which a simple means improves the sealing performance produced by an elastic sealing member housed in a joint body. At one end of a fluid passage 4 that penetrates through the inside of a joint body 1, there is disposed an enlarged diameter recess 8 in which the inner rear side thereof is made into a housing for sealing member 5 and the mouth side thereof is made into a housing for tube holding mechanism 7 having an engaging groove 6 for a tube holding mechanism 2. This joint body 1 is constructed as a cold-forged component of a metal material. An elastic sealing member 3 is housed in the above-mentioned housing for sealing member 5. An engaging section 13b having a sharp edge formed by outwardly folding an inner end side turnup section 13a of a guide member 13 made of a springy metal material disposed on the outer circumferential side of the tube holding mechanism is elastically engaged in a slip-resistant state with the engaging groove 6 of the housing for tube holding mechanism 7.

1 Claim, 2 Drawing Sheets

PIPE JOINT

CROSS-REFERENCE TO RELATED APPLICATIONS

This application is a continuation of U.S. patent application Ser. No. 09/570,176, filed on May 12, 2000 and currently pending. This application is related to and claims priority, under 35 U.S.C. § 119, from Japanese Patent Application No. 11-220117, filed on Aug. 3, 1999, the entire contents of which is hereby incorporated by reference herein.

FIELD OF THE INVENTION

The present invention relates to a quick-type pipe joint used for connection between various kinds of fluid pressure apparatus and a tube mainly in an air pressure circuit.

PRIOR ART

Conventionally, a quick-type pipe joint for use in an air pressure circuit is known in which a cylindrical joint body for housing a tube holding mechanism is made of a metal material. This joint body typically includes a fluid passage that penetrates through the inside thereof; a housing for housing a sealing member and an enlarged diameter recess for housing the aforesaid tube holding mechanism are disposed at one end of the fluid passage; and they are made of a cut product of a metal material made of brass or the like.

However, in the joint body made of the aforesaid cut product of the metal material, the surface roughness on the inner surface of the housing for sealing member does not necessarily reach a value suitable for sealing and, in some cases, air may possibly leak out, though only slightly, between the sealing member and the aforesaid inner surface of the housing of the joint body. Also, in a joint body made of a cut product, assembly may possibly end in a state in which cutting dusts produced at the processing time keep adhering to the inner surface of the housing for sealing member, whereby a defective product with incomplete sealing may be produced even though the processing is carried out appropriately.

Further, in the aforesaid conventional pipe joint, it is usually the case that a guide member made of synthetic resin is snap-fit onto the inside of the joint body made of the metal material. In this case, the strength of the pipe joint is largely dominated by the temperature characteristics of the guide member made of the synthetic resin, so that there have been strong desires for improvements in strength, thermal characteristics, and durability in various application fields.

SUMMARY OF THE INVENTION

The present invention has been made in order to solve these problems, and a technical object thereof is to provide a pipe joint in which a simple means further improves the sealing performance produced by an elastic sealing member housed in a joint body.

Another technical object of the present invention is to provide a pipe joint with improved assembling property of the elastic sealing member and improved air-tightness by using a joint body formed with improved surface roughness of the inner surface to be more suitable as a sealing surface.

Another technical object of the present invention is to provide a pipe joint with improved strength, thermal characteristics, and durability.

In order to achieve the aforesaid objects, a pipe joint of the present invention is characterized in that a joint body includes a fluid passage that penetrates through the inside thereof; at one end of the fluid passage in said joint body, there is disposed an enlarged diameter recess in which the inner rear side thereof is made into a housing for sealing member and the mouth side thereof is made into a housing for tube holding mechanism having an engaging groove for the tube holding mechanism; an attachment to a fluid pressure apparatus is disposed on an outer circumference of the other end of the joint body; the joint body having this construction is constructed as a cold-forged component of a metal material; the elastic sealing member for sealing between the inner surface of said housing for sealing member and the outer surface of the tube inserted through the tube holding mechanism is housed in said housing for sealing member; and a portion of the tube holding mechanism is elastically engaged in a slip-resistant state with the engaging groove of said housing for tube holding mechanism.

The pipe joint having the aforesaid construction can be used in the same manner as a conventional pipe joint. However, since the joint body in which the inner rear side of the enlarged diameter recess disposed at one end of the fluid passage is made into a housing for the elastic sealing member is constructed as a cold-forged component of a metal material, it is possible to obtain a joint body having an improved surface roughness easily as compared with a case in which the joint body is made by a cutting process or the like case. In particular, the surface roughness of the aforesaid housing for the elastic sealing member is improved, and its variation is stabilized, so that the sealing between the elastic sealing member and the inner surface of the housing can be made stable and more certain, and the sealing performance produced by the elastic sealing member can be improved.

Furthermore, there is no generation of contaminants at the time of molding the joint body, such as generation of cutting dusts accompanying the cutting or the like. Therefore, it is possible to avoid the case in which the air-tightness is hindered by adhesion of such contaminants to the inner surface of the housing for the elastic sealing member, and the cause of poor air-tightness is removed, whereby the assemblage will be easy and the quality of the product can be heightened.

In the aforesaid pipe joint, it is effective for improvement of performance if an engaging section having a sharp edge at its tip end is formed by outwardly folding an inner end side turnup section of a guide member made of a springy metal material disposed on an outer circumferential side of the tube holding mechanism; said engaging section is elastically engaged in a slip-resistant state with the engaging groove disposed in the housing for tube holding mechanism; a guide section for guiding a release bush used for releasing the inserted tube is made by inwardly folding the outer end of a cylindrical guide member located on the mouth side of the enlarged diameter recess; a projection which is in contact with an inner circumference of the enlarged diameter recess of the joint body is formed by outwardly folding an outer circumferential portion thereof to protrude; and the aforesaid guide section for guiding the release bush, the aforesaid projection, and the aforesaid engaging section on the inner end side of the guide member are formed by pressing a metal plate material.

Thus, if the guide member disposed on the outer circumferential side of the tube holding mechanism is constructed with a springy metal material and pressed into the aforesaid joint body, and the sharp edge at the tip end of the engaging section which edge is formed by folding the inner end side turnup section of the guide member is elastically engaged in a slip-resistant state with the engaging groove of the joint body, then a pipe joint with improved strength, thermal characteristics, and durability can be obtained because both are made of metal and, therefore, the influence of the temperature on their joining strength is small.

Further, by forming the aforesaid guide section of the guide member for guiding the release bush, the aforesaid projection, and the aforesaid engaging section on the inner end side of the guide member are formed by pressing a metal plate material and by disposing the guide member to allow the projection to be in contact with the inner circumference of the enlarged diameter recess of the joint body, the tube holding mechanism can be positioned stably in the enlarged diameter recess, the rigidity of the product itself increases, and the resistance to the rocking of the guide member is improved, so that air-tightness and durability against rocking of the tube and vibration of the joint body can be improved.

Moreover, this guide member can be made into a simple and multifunctional component, and a stable state of being mounted on the joint body can be ensured.

DETAILED DESCRIPTION OF THE PREFERRED EMBODIMENTS

Figure 1:
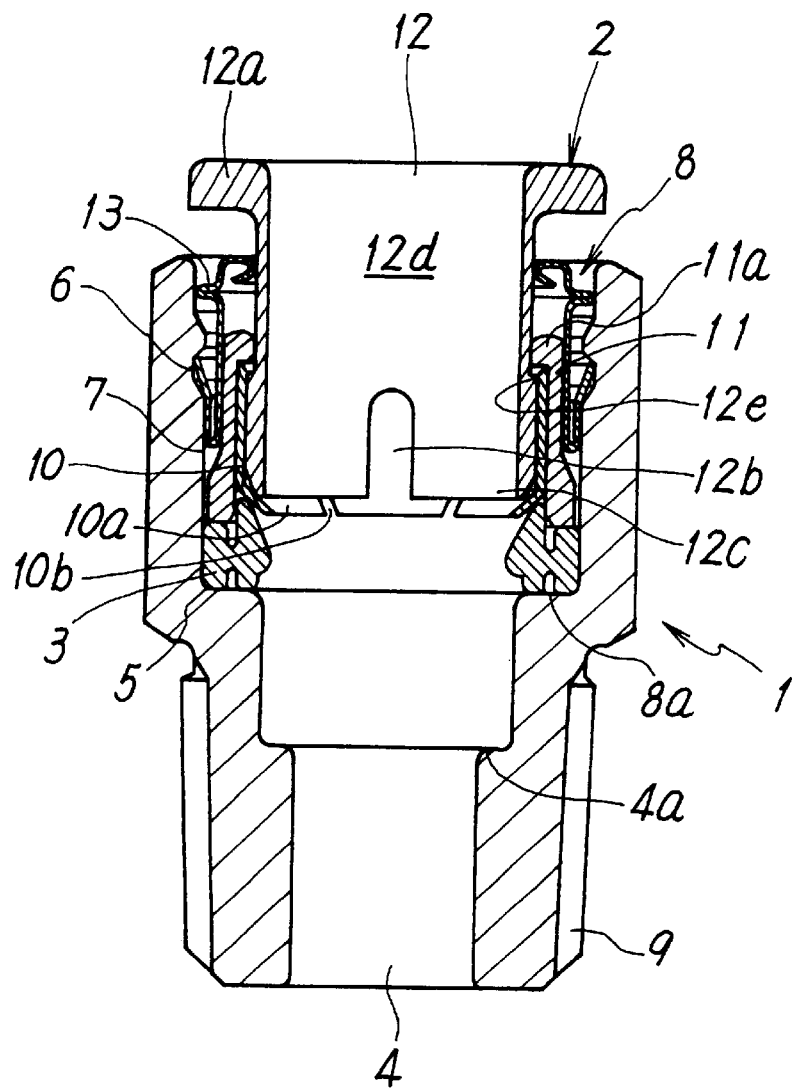
FIG. 1 is a cross-sectional view illustrating an embodiment of a pipe joint according to the present invention.

FIG. 1 illustrates an embodiment of a pipe joint according to the present invention. The pipe joint for a tube according to this embodiment includes a cylindrical joint body 1, a tube holding mechanism 2 incorporated in said joint body 1 for holding an end of the tube, and an elastic sealing member 3 housed in the joint body 1.

Figure 2:
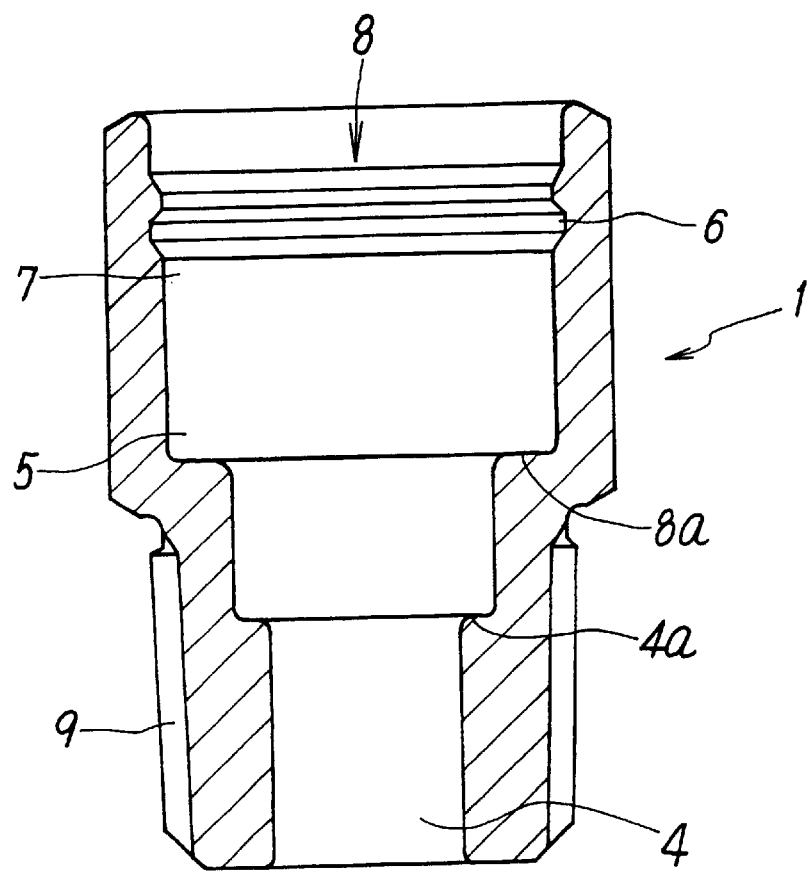
FIG. 2 is a cross-sectional view of a joint body in the aforesaid embodiment.

The aforesaid joint body 1 is made by cold-forging an iron-based metal material and, as will be understood from FIG. 2, a fluid passage 4 for passing fluid through the tube to a fluid pressure apparatus is disposed inside of the joint body 1 so as to penetrate through said joint body 1 in an axial direction. An enlarged diameter recess 8 is disposed at one end of this fluid passage 4, and this enlarged diameter recess 8 is composed of a housing 5 located on the inner rear side of the fluid passage 4 for housing a sealing member 3 and a housing 7 located on the mouth side of the fluid passage 4 for housing the tube holding mechanism 2. Said housing 7 includes an engaging groove 6 that engages with the tube holding mechanism 2.

Further, a screw-type attachment 9 for attaching to the fluid pressure apparatus is disposed on the outer circumference at the other end of this joint body 1.

The aforesaid tube holding mechanism 2 includes a chuck 10 made of metal and having a plurality of engaging pawls 10a that engage with an outer surface of the inserted tube, a collet 11 located outside of said chuck 10 for holding the chuck 10, a release bush 12 held with its tip end inserted in said chuck 10 for opening the aforesaid engaging pawls 10a to release them from the tube by pressing, and a guide member 13 for housing these members stably in the housing section 7 in the joint body 1. A portion of this guide member 13 is elastically engaged in a slip-resistant state with the engaging groove 6 in said housing 7.

In the aforesaid chuck 10, the aforesaid plurality of engaging pawls 10a with inwardly bent tip ends are formed by disposing a plurality of slits 10b in a cylindrical member made of metal, and elasticity in the radial direction is imparted to these engaging pawls 10a by the aforesaid slits 10b. The engaging pawls 10a bite the outer circumferential surface of the tube to hold the tube.

The aforesaid collet 11 is formed of synthetic resin in a cylindrical shape capable of holding the chuck 10 from the outside, and includes an inwardly-extending flange 11a at an end located on the mouth side of the enlarged diameter recess 8 of the joint body 1, i.e. at an outer end. This flange 11a engages with an end portion of the aforesaid chuck 10 located at the end opposite to the engaging pawls 10a to restrain the chuck 10 from escaping when a force in the direction of drawing the tube out is applied. Elasticity in the radial direction is imparted to an end portion of the collet 11 located on the inner rear side of the enlarged diameter recess 8 of the joint body 1, i.e. to an inner end portion, by disposing slits (not illustrated) similar to those of the aforesaid chuck 10.

The aforesaid release bush 12 is held in a state with its tip end inserted into the chuck 10, and includes a head portion 12a that protrudes to the outside of the joint body 1 for pressing and a leg portion 12c having elasticity imparted in the radial direction by the slits 12b formed in the axial direction for opening. The inside of the aforesaid release bush 12 is made into an insertion hole 12d for the tube 3.

This release bush 12 is prevented from escaping from said collet 11 by confronting the tip end of the aforesaid leg portion 12c with the inside of the engaging pawls 10a in the aforesaid chuck 10 and engaging a peripheral step portion 12e with the inwardly-extending flange 11a of the collet 11. By pressing the head portion 12a to press the leg portion 12c in the tip end direction of the engaging pawls 10a of the chuck 10, the engaging pawls 10a are press-opened to release the engagement between the engaging pawls 10a and the tube.

To the outer circumferential portion of the aforesaid tube holding mechanism 2, a guide member 13 is fitted for elastically engaging the tube holding mechanism 2 itself in a slip-resistant state in the housing 7 of the joint body 1.

Figure 3:
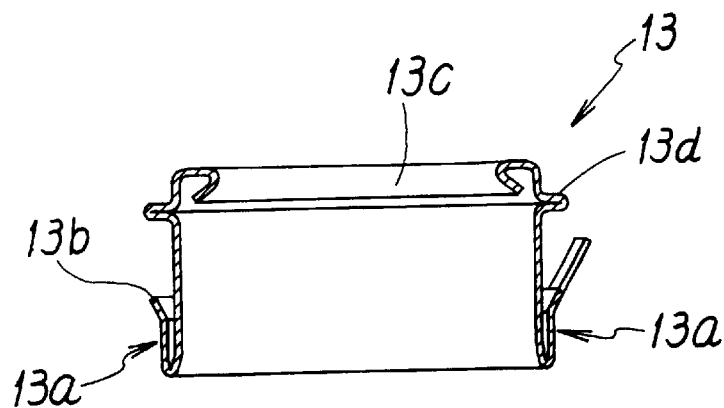
FIG. 3 is a cross-sectional view of a guide member in the aforesaid embodiment.

Referring to FIG. 3, this guide member 13 is formed of a springy metal material in a cylindrical shape and, by outwardly folding the metal material, a turnup section 13a is formed over the entire circumference of the inner end portion of the guide member 13 inserted into the inner rear side of the enlarged diameter recess 8 of the joint body 1. An engaging section 13b having a sharp edge is formed at the tip end of this turnup section 13a.

The aforesaid turnup section 13a expands and contracts elastically in the radial direction of the guide member 13 by the springiness of the metal material used as a raw material. By pressing the guide member 13 into the housing 7 in mounting the tube holding mechanism 2 into the housing 7, the turnup section 13a is pressed into the housing 7 while expanding or contracting in accordance with the uneven shape of the inner circumference of the housing 7. By enlarging the diameter in the engaging groove 6 of the housing 7, the edge of the engaging section 13b at the tip end engages elastically with the groove wall of the engaging groove 6 to be brought into a slip-resistant state. This allows the tube holding mechanism 2 to be housed stably in the housing 7.

On the other hand, by inwardly folding the raw material, a guide section 13c for guiding the release bush 12 is formed over the entire circumference of the outer end portion of the aforesaid guide member 13, i.e. the end portion located on the mouth side of the enlarged diameter recess 8 of the joint body 1. Further, a projection 13d which is in contact with the inner circumference of the enlarged diameter recess 8 of the joint body 1 is formed on the outer circumferential portion of the guide member 13 by bending said outer circumferential portion to protrude outward.

The aforesaid guide section 13c serves to guide the release bush 12 in the axial direction of the enlarged diameter recess 8 so that the operations of pushing, pressing, and returning the release bush 12 can be performed stably within the joint body 1. The aforesaid guide section 13c abuts the outer circumferential surface on the inner side of the head portion 12a of the release bush 12 at the mouth portion of the enlarged diameter recess 8 to an extent that does not hinder the operations of the release bush 12.

Further, the projection 13d serves to stabilize the guide member 13 to prevent movement of the guide member 13 in the enlarged diameter recess 8 so that the tube holding mechanism 2 will not move in a radial direction within the enlarged diameter recess 8.

The guide section 13c for guiding the release bush, the projection 13d, the turnup section 13a, and the engaging section 13b in this guide member 13 are integrally formed by pressing a metal plate member.

This allows the tube holding mechanism 2 to be positioned stably in the enlarged diameter recess 8, whereby the rigidity of the product itself increases and, at the same time, the resistance against rocking of the guide member 13 is improved. Therefore, air-tightness and durability can be improved against rocking of the tube and vibration of the joint body itself. Moreover, this guide member 13 can be made into a simple and multifunctional component, and a stable state of being mounted on the joint body 1 can be ensured.

Further, since the aforesaid guide member 13 is formed of metal in the same manner as the aforesaid joint body 1, the influence of temperature on their joining strength will be small, so that the pipe joint as a whole will be extremely superior in strength, thermal characteristics, and durability.

The aforesaid elastic sealing member 3 is housed in the housing for sealing member 5 of the enlarged diameter recess 8 of the joint body 1, and is in a state of being interposed between the aforesaid tube holding mechanism 2 and the step portion 8a of the enlarged diameter recess 8.

This elastic sealing member 3 serves to seal the outer circumference of the tube inserted in the fluid passage 4, and this tube is inserted up to a position of hitting a stopper section 4a having a smaller diameter than the diameter of the housing for sealing member 5 in an inner rear side deeper than the enlarged diameter recess 8 in the fluid passage 4 of the joint body 1 through an insertion hole 12d in the aforesaid release bush 12.

The joint body 1 having the above-described construction is formed as a cold-forged product of an iron-based metal material. This improves the dimension precision thereof and allows the finish after processing to be smooth with superior surface roughness as compared with the case in which the joint body 1 is subjected to a cutting process.

An actual measurement made by the inventors of the present invention has revealed that the surface roughness (Rmax) of the joint body 1 molded by cold-forging according to the present invention is 1.00 to 2.00, whereas the surface roughness (Rmax) of a conventional joint body formed by cutting is 4.00 to 7.00. This allows a joint body 1 to be obtained in which the surface roughness thereof is improved to an extent of being suitable as a sealing surface brought into contact with the elastic sealing member 3 for sealing and in which the variation thereof is stabilized, whereby the air-tightness of the elastic sealing member 3 can be improved.

Here, in order to bring the surface roughness of the joint body formed by cutting to a level of a cold-forged product, a secondary process is required in any way. For example, a rolling process or a fine cutting process such as lapping, buffing or forming by burnishing must be carried out, thereby requiring an additional labor therefor. Moreover, if a cutting dust is produced by cutting, it is necessary to remove the cutting dust so that it will not be an obstacle against the sealing property. For this reason, a cost increase of some extent is inevitable for improvement of the quality of products produced by cutting. However, according to the above-described cold-forging, the cost thereof can be reduced and, in addition, there is no generation of cutting dust or the like that will be an obstacle against the sealing property, such as in the case of using a cutting process.

The pipe joint having the aforesaid construction can be used in the same manner as a conventional pipe joint. However, since the joint body 1 in which the inner rear side of the enlarged diameter recess 8 disposed at one end of the fluid passage 4 is made into a housing 5 for the elastic sealing member is constructed as a cold-forged component of a metal material, it is possible to obtain a joint body 1 having a more improved surface roughness easily as compared with a case in which the joint body is made by a cutting process or the like case.

In particular, according to the aforesaid joint body 1, the surface roughness of the housing 5 for the elastic sealing member is improved, its variation is stabilized, and also it is possible to avoid the case in which the air-tightness is hindered by adhesion of contaminants generated at the time of molding to the inner surface of the housing the elastic sealing member 3. Therefore, the sealing between the elastic sealing member 3 and the inner surface of the housing 5 can be made stable and certain, the sealing performance produced by the elastic sealing member 3 can be improved, and the quality of the product can be heightened.

In the above-described embodiment, the tube holding mechanism 2 is elastically engaged in a slip-resistant state with the housing 7 in the joint body 1 by means of the turnup section 13a of the guide member 13 in the tube holding mechanism 2. However, it is not limited to this alone, and instead of this, a portion of the tube holding mechanism 2 may be engaged with the housing 7.

According to the pipe joint of the present invention described above in detail, since the joint body in which the inner rear side of the enlarged diameter recess is made into a housing for the elastic sealing member is constructed as a cold-forged component of a metal material, it is possible to improve the surface roughness more with ease as compared with a case in which the joint body is made by a cutting process or the like case. In particular, the surface roughness of the aforesaid housing for the elastic sealing member is improved, and its variation is stabilized, so that the sealing between the elastic sealing member and the inner surface of the housing can be made stable and certain, and the sealing performance produced by the elastic sealing member can be improved.

Furthermore, there is no generation of contaminants at the time of molding the joint body, such as the generation of cutting dusts accompanying the cutting or the like.

Therefore, it is possible to avoid the case in which the air-tightness is hindered by adhesion of such contaminants to the inner surface of the housing for the elastic sealing member, and the cause of poor air-tightness is removed, whereby the assemblage will be easy and the quality of the product can be heightened.

What is claimed is:

1. A pipe joint comprising;

a cylindrical joint body, made of a cold-forged component of a metal material, having a fluid passage that penetrates therethrough in an axial direction inside thereof;

a tube holding mechanism for holding an end of a tube in a freely engageable and disengageable manner;

an elastic sealing member for sealing around said tube held by said tube holding mechanism;

an enlarged diameter recess formed in a fluid passage portion of said fluid passage of said cylindrical joint body towards a tip end of said fluid passage, said enlarged diameter recess including an elastic sealing member housing for housing said elastic sealing member on an inner rear side of said fluid passage and a tube holding mechanism housing for housing said tube holding mechanism on a passage inlet side;

an engaging groove disposed on an inner circumferential surface of said tube holding mechanism housing;

an attachment to a fluid pressure apparatus disposed on a base end of said cylindrical joint body;

said elastic sealing member being for sealing between an inner surface of said elastic sealing member housing and an outer surface of said tube inserted through said tube holding mechanism;

said tube holding mechanism being housed in a slip-resistant state in said tube holding mechanism housing and said engaging groove;

a cylindrical guide member, made of a springy metal material, fitted onto an outer circumference of said tube holding mechanism, said cylindrical guide member having a turnup section formed by outwardly folding a tip end portion of a cylinder;

an engaging section having a sharp edge formed at a tip end of said turnup section such that said tube holding mechanism is housed in a slip-resistant state in said tube holding mechanism housing by elastically engaging said engaging section and said engaging groove;

said tube holding mechanism including a plurality of engaging pawls for elastically engaging an outer circumference of said tube held therein and a cylindrical release bushing that allows drawing of said tube by releasing an engagement of said engaging pawls by a pushing operation;

said cylindrical guide member including a guide section formed by inwardly folding an end portion thereof and a projection formed by folding a portion of an outer circumference thereof to protrude outwardly, said guide section guiding an operation of said cylindrical release bushing by a sliding contact with an outer circumferential surface of said cylindrical release bushing;

said projection holding said tube holding mechanism stably in said enlarged diameter recess by abutting an inner circumferential surface of said enlarged diameter recess; and all of said guide section, said projection, and said turnup section of said guide member being integrally formed by pressing a metal plate material.

* * * * *